(12) United States Patent
Kato et al.

(10) Patent No.: US 7,097,185 B2
(45) Date of Patent: Aug. 29, 2006

(54) SUSPENSION CROSS MEMBER

(75) Inventors: Shinji Kato, Aichi (JP); Shigeki Hama, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 132 days.

(21) Appl. No.: 10/743,150

(22) Filed: Dec. 23, 2003

(65) Prior Publication Data
US 2004/0140659 A1    Jul. 22, 2004

(30) Foreign Application Priority Data
Dec. 25, 2002  (JP) ............... P2002-375203
Dec. 25, 2002  (JP) ............... P2002-375204

(51) Int. Cl.
*B62D 21/11*  (2006.01)
(52) U.S. Cl. ............... 280/124.109; 280/788; 180/311
(58) Field of Classification Search ......... 280/124.109, 280/788; 180/312
See application file for complete search history.

(56) References Cited

U.S. PATENT DOCUMENTS

| 6,170,906 | B1 * | 1/2001 | Kasuga ............... 296/203.02 |
| 6,402,172 | B1 * | 6/2002 | Suzuki ............... 280/124.109 |
| 6,409,216 | B1 * | 6/2002 | Suzuki ............... 280/781 |
| 6,494,472 | B1 * | 12/2002 | Suzuki ............... 280/124.109 |
| 2001/0022437 | A1 * | 9/2001 | Suzuki ............... 280/124.134 |

FOREIGN PATENT DOCUMENTS

| JP | 6-270837 A | 9/1994 |
| JP | 2001-253218 A | 9/2001 |

* cited by examiner

*Primary Examiner*—Paul N. Dickson
*Assistant Examiner*—George D. Spisich
(74) *Attorney, Agent, or Firm*—Birch, Stewart, Kolasch, and Birch, LLP

(57) ABSTRACT

A suspension cross member has a bulkhead interposed between an upper member plate and a lower member plate in such a manner as to extend longitudinally rearward from a disconnection initiating point on a forward arm side along an inner side of the upper member plate and an inner side of the lower member plate. The bulkhead is joined to the upper member plate and the lower member plate, respectively.

7 Claims, 3 Drawing Sheets

SUSPENSION CROSS MEMBER

CROSS-REFERENCE RELATED APPLICATION

This application incorporates by reference the subject matter of Application No. 2002-375203 filed in Japan on 25 Dec. 2002 and Application No. 2002-375204 filed in Japan on 25 Dec. 2002, on which priority claims are based under 35 U.S.C § 119(a).

BACKGROUND OF THE INVENTION

1. Field of the Invention

The present invention relates to a suspension cross member, and more particularly to a suspension cross member to which forward arms and rearward arms of a pair of lower arms are coupled at ends thereof which extends to be bifurcated.

2. Description of the Related Art

In a vehicle body made of a monocoque structure, in order to increase the strength and rigidity of a part of the vehicle body to which a front suspension system is disposed and hence to which a large force is applied, a suspension cross member is provided on an underside of the vehicle body in such a manner as to extend in a transverse direction of a vehicle.

Since forward arms and rearward arms of lower arms which support wheels (front wheels) are coupled to left and right ends of the suspension cross member, and since equipment such as a transmission is disposed on the periphery of the suspension cross member, the left and right ends are each generally formed into a shape which is bifurcated into a forward portion and a rearward portion at a bifurcation proximal end, and the forward arm is coupled to the forward portion so bifurcated via a coupling member, whereas the rearward arm is coupled to the rearward portion via a coupling member.

In the suspension cross member, in order to reduce the weight thereof, a closed cross-sectional structure made of an upper member plate and a lower member plate which are superposed and are then joined together along circumferential edges thereof, has been adopted.

In recent years, in an attempt to reduce the weight further, a structure in which the upper member plate and the lower member plate are not joined together but are disconnected from each other in the vicinity of the bifurcation proximal end portions at the ends of the suspension cross member so as to form has been adopted. The rearward arms of the lower arms are inserted from the openings so as to be coupled together by being held directly between the upper member plate and the lower member plate without using coupling members within the closed cross section.

In the suspension cross member which are bifurcated at the ends thereof, when a force is inputted in a rearward direction of a vehicle from the lower arm via the forward arm, there are applied various rotational forces which attempt to rotate the forward portion and the rearward portion about the position in the vicinity of the bifurcation proximal end portion. Therefore, in the structure in which the upper member plate and the lower member plate are overlapped in such a manner as to have the openings, when the rotational force is applied to the forward portion and the rearward portion which are bifurcated at the end of the suspension cross member about the position in the vicinity of the bifurcation proximal end portion, a large moment is likely to be applied to a root portion of the forward portion and a root portion of the rearward portion by virtue of an excessive input to thereby bend and deform those root portions.

To cope with this, there has been developed a technique in which a reinforcement bracket is joined to in particular, a root portion of a rearward portion at each end of a suspension cross member having openings like those mentioned above whose rearward portion is expected to be bent and deformed due to the presence of the opening. (Refer to JP-A-2001-253218.)

Also, there has been developed a technique in which bulkheads for reinforcement are joined to each of a forward portion's root portion and a rearward portion's root portion to increase the rigidity of the root portions of the forward and rearward portions that are bifurcated. (Refer to JP-A-6-270837.)

Incidentally, as with the suspension cross member disclosed in JP-A-2001-253218, the attachment point where the forward arm of the lower arm is attached to the suspension cross member tends to be located far away from the bifurcation proximal end portion generally due to the availability of space, whereby there is a tendency that a large rotational force is applied in an attempt to rotate, in particular, the forward portion of the suspension cross member. When the large rotational force is applied to the forward portion, a large force is caused to be applied to a disconnection initiating point of the opening in an attempt to disconnect the upper member plate and the lower member plate which are joined together, and the opening is then caused to open further.

When there is force attempting to open the opening further, in the suspension cross member disclosed in JP-A-2001-253218, since the bracket is constructed to be simply joined to the lower member plate and is simply joined to the lower member plate even at the position in the vicinity of the disconnection initiating point, the upper member plate is made to open freely, resulting in a problem that the joint between the upper member plate and the lower member plate may easily break at the disconnection initiating point.

In this case, it is conceivable to joint the bracket also to the upper member plate. However, since the cross section of the bracket disclosed in JP-A-2001-253218 is formed into a U-shape and a flange is facing in a transverse inward direction of the vehicle, a joining operation that occurs after the upper plate member and the lower plate member have been joined together becomes difficult.

In addition, as disclosed in JP-A-2001-253218, in the event that the upper plate member and the lower plate member are constructed so as to be disconnected abruptly from the disconnection initiating point, when the rotational force attempting to rotate the forward portion rearward is applied, since the open edges are easily opened, the disconnection initiating point is easily shifted toward the bracket side, and the aforesaid problem becomes remarkable.

Incidentally, various rotational forces which attempt to rotate the forward portion and the rearward portion are exerted about the position in the vicinity of the bifurcation proximal end portion, that is, the position deviated to some extent from the bifurcation proximal end portion. Thus, a stress concentration at the bifurcation proximal end portion occurs due to the rotational force that attempts to rotate the forward portion and the rotational force that attempts to rotate the rearward portion.

Particularly, in the suspension cross member disclosed in JP-A-6-270837 in which bulkheads for reinforcement are joined to each of the forward portion's root portion and the rearward portion's root portion, excessive stress concentration occurs at the bifurcation proximal end portion although deformation of the forward and rearward portions are suppressed.

Especially, since the attachment point where the forward arm of the lower arm is attached to the suspension cross member tends to be located far away from the bifurcation proximal end portion generally due to the availability of space, stress concentration caused by a rotational force that attempts to rotate the forward portion becomes a problem.

When the excessive stress concentration occurs in the bifurcation proximal end portion, cracks may be generated at the bifurcation proximal end portion, whereby fatigue distraction may be caused.

It is conceivable to increase the thickness of the upper and lower member plates. However, this is not practical since the costs and weight increase.

SUMMARY OF THE INVENTION

The invention was made to solve the problem, and provides a suspension cross member having an upper member plate and a lower member plate which are disconnected from each other to form openings in the vicinity of bifurcation proximal end portions at ends of the suspension cross member where the suspension cross member extends to be bifurcated and which are joined together along circumferential edges thereof except the openings so formed to thereby have a closed cross section and in which support points for rearward arms of lower arms which are inserted from the openings are provided to be located longitudinally rearward of the bifurcation proximal end portions within the closed cross section, wherein a separation of the upper plate member and the lower plate member at the disconnection initiating points of the openings is prevented.

According to a first aspect of the invention, there is provided a suspension cross member attached to an underside of a vehicle body in such a manner as to extend in a transverse direction of a vehicle, including: upper and lower member plates which are disconnected from each other in the vicinity of bifurcation proximal end portions at ends of the suspension cross member where the suspension cross member extends to be bifurcated into a forward portion located on a longitudinally forward side of the suspension cross member and a rearward portion located on a longitudinally rearward side of the suspension cross member to define openings and which are joined together along circumferential edges thereof to thereby have a closed cross section; support points for forward arms of a pair of lower arms that support wheels, the support points disposed on the forward portions of the upper and lower member plates at external positions to the closed cross section, respectively; support points for rearward arms of the pair of lower arms which are inserted through the openings, the support points disposed on the rear portions at internal positions of the closed cross section, respectively; and bulkheads provided between the upper and the lower member plates transversely inwardly of the support points for the rearward arms in such a manner that a circumferential edge of each of the bulkheads extends longitudinally to a rear of the vehicle from a disconnection initiating point located on a forward arm side of the opening along inner sides of the upper and the lower plate members so as to be joined to the upper and lower plate members; wherein each of the bulkheads is joined to the upper and the lower member plates at least in the vicinity of the disconnection initiating point.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PRESENT INVENTION

An embodiment of a suspension cross member according to the invention will be described with reference to the accompanying drawings.

Figure 1:
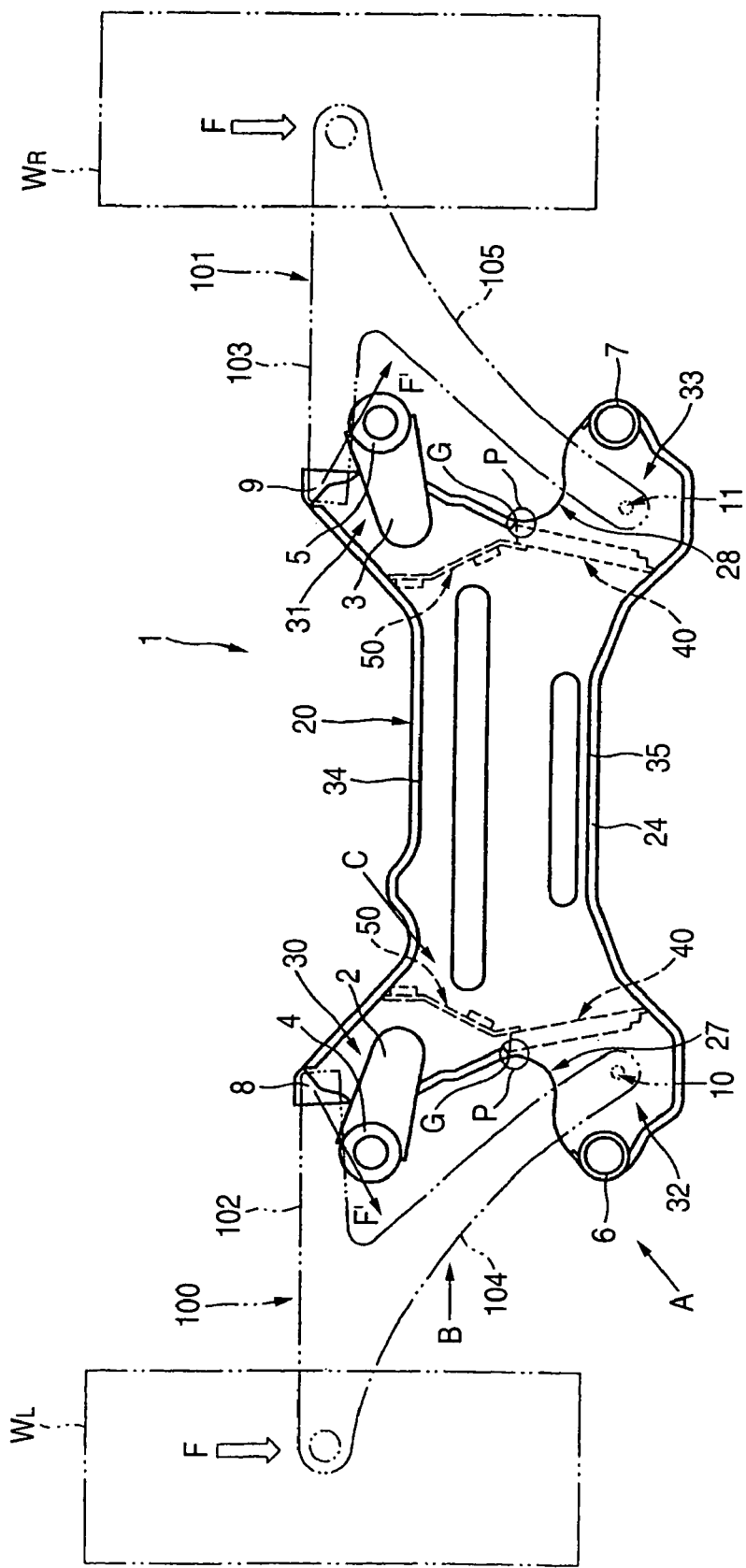
FIG. 1 is a top view of a suspension cross member according to an embodiment of the invention.
Figure 2:
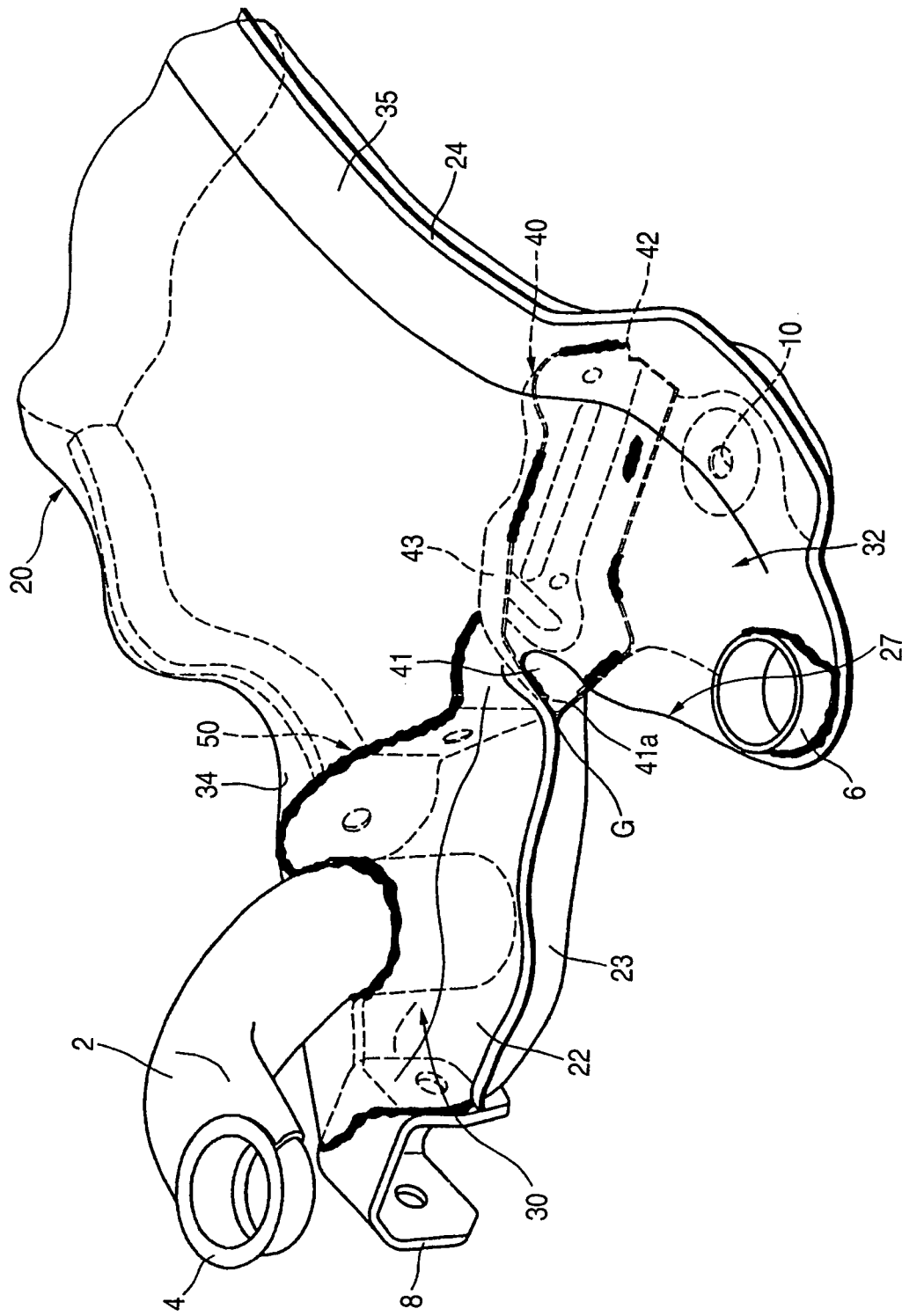
FIG. 2 is a perspective view of a left-hand side transverse part of the suspension cross member as viewed in a direction indicated by an arrow A in FIG. 1.
Figure 3:
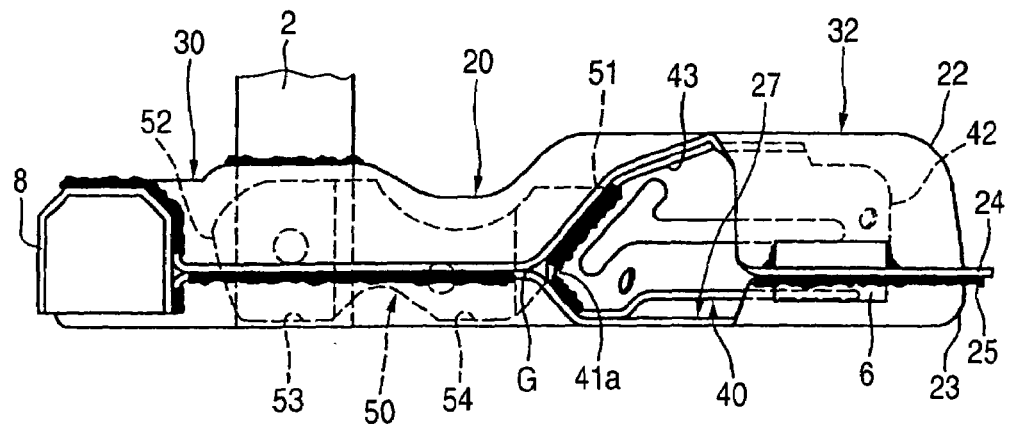
FIG. 3 is a side view of the suspension cross member as viewed in a direction indicated by an arrow B in FIG. 1.
Figure 4:
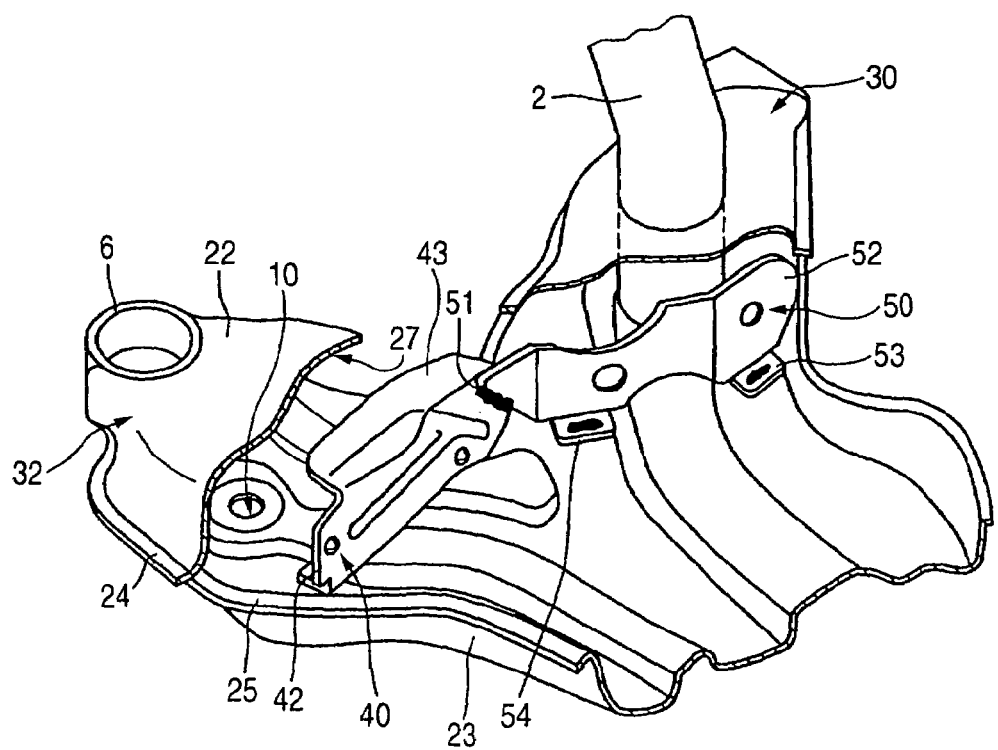
FIG. 4 is a drawing illustrating the internal structure of the suspension cross member as viewed in a direction indicated by an arrow C in FIG. 1.

FIG. 1 is a top view of a suspension cross member according to an embodiment of the invention, and FIG. 2 is a perspective view of a left-hand side transverse part of the suspension cross member as viewed in a direction indicated by an arrow A in FIG. 1. FIG. 3 is a side view of the suspension cross member as viewed in a direction indicated by an arrow B in FIG. 1, and FIG. 4 illustrates an internal structure of the suspension cross member as viewed in a direction indicated by an arrow C in FIG. 1.

The suspension cross member 1 disposed on an underside of a vehicle body (for example, undersides of a pair of side members) in such a manner as to extend in a transverse direction of a vehicle in order to increase the strength and rigidity of the vehicle body at a location where a front suspension system is disposed. A pair of vehicle body coupling members 4, 5 is provided by welding onto a member main body 20 at both ends on a forward side of the suspension cross member 1 via support members 2, 3 which are formed of a steel material, and vehicle body coupling members 6, 7 are provided by welding onto the member main body 20 on a rearward side thereof.

The vehicle body coupling members 4, 5, 6, 7 are made of metal washers, for example, and the suspension cross member 1 is attached to the underside of the vehicle body by passing bolts through the respective vehicle body coupling members 4, 5, 6, 7.

More specifically, due to the availability of space for disposing an apparatus such as a transmission, the member main body 20 is bifurcated at left and right transverse ends thereof into forward portions 30, 31 and rearward portions 32, 33 of the suspension cross member, and the support members 2, 3 for the vehicle body coupling members 4, 5 are welded to the forward portions 30, 31, respectively, whereas the coupling members 6, 7 are welded to distal ends of the rearward portions 32, 33, respectively.

As shown in FIGS. 2, 3, the member main body 20 includes an upper member plate 22 and a lower member plate 23 which are formed from a thick sheet steel. More specifically, the member main body 20 is constructed by overlapping circumferential flanges 24, 25 of the upper member plate 22 and the lower member plate 23 and then welding them together except at openings 27, 28 (see FIG.

1) so that a closed cross section is formed by the upper member plate 22 and the lower member plate 23.

Then, arm coupling brackets 8 and 9, to which forward arms 102, 103 of lower arms 100, 101 which support wheels WL, WR are coupled, are welded to the forward portions 30, 31 of the suspension cross member 1, respectively.

In addition, as shown in FIGS. 2 and 3, arm coupling holes 10, 11, which are located in the lower member plate 23 for coupling rearward arms 104, 105 of the lower arms 100, 101, are formed in the rearward portions 32 and 33 of the suspension cross member 1. Namely, the arm coupling brackets 8, 9 for forward arms 102, 103 are provided outside the member main body 20, whereas the arm coupling holes 10, 11 for the rearward arms 104, 105 are formed in the interior of the closed cross section constituted by the upper member plate 22 and the lower member plate 23. Namely, the rearward arms 104, 105 are inserted into the interior of the closed cross section through the openings 27, 28 and are then coupled to the member main body 20 at the arm coupling holes 10, 11.

The openings 27, 28 are each defined by disconnecting the circumferential flanges 24, 25 from each other from a position in the vicinity of a bifurcation proximal end portion P (a range circled by a circle in FIG. 1) between the forward portions 30, 31 and the rearward portions 32, 33 toward a distal end portion of the rearward portion. Namely, the member main body 20 is made to open from a disconnection initiating point G between the circumferential flange 24 and the circumferential flange 25 which is located in the vicinity of the bifurcation proximal end portion P to the vicinity of the vehicle coupling member 6, 7 at the distal end of the rearward portions 32, 33.

In addition, the openings 27, 28 are made to open by providing sloping surfaces such that opening dimensions thereof increase gradually from the disconnection initiating point G.

On the other hand, bulkheads 40, 40 made of a thick sheet steel are interposed between the upper member plate 22 and the lower member plate 23 transversely and inwardly of the arm coupling holes 10, 11 which constitute points where the rearward arms 104, 105 are coupled in such a manner that a front end 41 is located at the disconnection initiating point G, a circumferential edge extends longitudinally rearward from the disconnection initiating point G along inner sides of the upper member plate 22 and the lower member plate 23, and a rear end 42 is brought into abutment with a rear wall 35 of the member main body 20.

Namely, the bulkheads 40, 40 are provided to extend at roots portion of the rearward portions 32, 33.

More specifically, a circumferential flange 43 is formed along the bulkhead 40 except the rear end 42 in such a manner as to extend continuously from the front end 41 corresponding to the disconnection initiating point G along the upper member plate 22 and the lower member plate 23 while being caused to face the openings 27, 28, and the bulkhead 40 is provided such that a distal end 41a of the circumferential flange 43 which corresponds to the front end 41 is located at the disconnection initiating point G.

The rear end 42 of the bulkhead 40 is welded to the rear wall 35 of the member main body 20, and the circumferential flange 43 is welded, respectively, to the upper member plate 22 and the lower member plate 23 at predetermined positions therealong. More specifically, the circumferential flange 43 is securely welded to the upper member plate 22 and the lower member plate 23 along the sloping surfaces in the vicinity of the disconnection initiating point G, to the rear wall 35 of the member main body 20 at the rear end 42, and to the upper member plate 22 and the lower member plate 23 at other optional positions therealong.

Since the bulkhead 40 extends longitudinally rearward from the disconnection initiating point G along the inner side of the upper member plate 22 and the inner side of the lower member plate 23 and is then welded to the upper member 22 and the lower member 23, a portion between the position in the vicinity of the bifurcation proximal portion P and an inner side of the rear wall 35 of the member main body 20, that is, the root portion of the rearward portions 32, 33 are reinforced to thereby increase the rigidity. Thus, even in case where forces F are input as indicated by thick white arrows in FIG. 1 from the wheels WL, WR in such a manner that components of the forces F are applied to the rearward portions 32, 33 via the rearward arms 104, 105 of the lower arms 100, 101, deformation of the rearward portions 32, 33 can be prevented.

In addition, since the circumferential flange 43 is formed along the circumferential edge of the bulkhead 40 in such a manner as to extend continuously from the front end 41 which corresponds to the disconnection initiating point G along the upper member plate 22 and the lower member plate 23, the rigidity of the bulkhead 40 is increased, and even if a force is applied to the member main body 20 vertically of the vehicle, deflection and depression of the upper member plate 22 and the lower member plate 23 can be prevented in an ensured fashion.

Furthermore, in the event that a component of the force F, such as one indicated by the arrow, that is, a rotational force F' is generated about the position in the vicinity of the bifurcation proximal end portion P so as to be applied to the forward portions 30, 31 via the forward arms 102, 103 due to the input force F, a force attempting to push the bulkhead 40 rearward is applied to the disconnection initiating point G of the openings 27, 28, and eventually, a large force is then applied which acts to break the welding between the circumferential flanges 24, 25 in the vicinity of the disconnection initiating point G, that is, the welding between the upper member plate 22 and the lower member plate 23. However, since the bulkhead 40 is welded, respectively, to the upper member plate 22 and the lower member plate 23 in an ensured fashion in the vicinity of the disconnection initiating point G, the expansion of the openings 27, 28 can be prevented, and hence a risk that the welding between the upper member plate 22 and the lower member plate 23 is broken in the vicinity of the disconnection initiating point G is prevented.

In particular, the openings 27, 28 have the sloping surfaces such that the opening dimensions thereof increase gradually from the disconnection initiating point G. When the rotational force F' is applied to the forward portions 30, 31 at the bifurcated end of the suspension cross member, the rotational force F' so applied is transmitted substantially along the upper member plate 22 and the lower member plate 23. Thus, since the open edge of the openings 27, 28 is made difficult to be deformed, that is, since the disconnection initiating point G is made difficult to shift to the bulkhead 40 side, it is further ensured that a risk of the welding between the upper member plate 22 and the lower member plate 23 being broken is prevented. Note that while the inclination angle of the sloping surfaces should be as moderate as possible, the angle is set to an appropriate angle due to the limitation to space available.

In addition, since the opening 27, 28 has the sloping surfaces so as to expand gradually, the bulkhead 40 is formed into a wedge-like shape. Since the opening 27, 28 has the sloping surfaces, the rigidity and strength of the member main body 20 are made high. In addition, as has been described above, since the bulkhead 40 is welded to the upper member plate 22 and the lower member plate 23 in the vicinity of the disconnection initiating point G in the ensured fashion, a risk that the welding between the upper member plate 22 and the lower member plate 23 in the vicinity of the disconnection initiating point G is broken is prevented.

Incidentally, in a fabricating process, the bulkhead 40 is, for example, attached to the upper member plate 22 by being welded to the upper member plate 22 in advance along the circumferential flange 43 and at the rear end 42 thereof, and in a later step, when the lower member plate 23 is placed over the upper member plate 22 to which the bulkhead 40 has already been attached so that the circumferential flanges 24, 25 are welded together, the circumferential flange 43 which extends along the lower member plate 23 is also welded thereto at the same time.

Specifically, when the circumferential flange 43 is welded the lower member plate 23, a welding location of the circumferential flange 43 which is located in the vicinity of the distal end 41a where a welding torch can be inserted from the openings 27, 28 is welded through the openings 27, 28 side, whereas a welding location in the vicinity of a position closer to the rear end 42 where the welding torch cannot be inserted is slot (or plug) welded from the outside of the lower member plate 23.

Namely, since the circumferential flange 43 extends toward the opening 27, 28, the bulkhead 40 can be welded easily even in a state where the lower member plate 23 is placed over the upper member plate 22, whereby the bulkhead 40 can be welded to not only the upper member plate 22 but also the lower member plate 23 in the vicinity of the disconnection initiating point G in the ensured fashion. Likewise, the bulkhead 40 may be welded to the lower member plate 23 in advance.

In addition, as shown in FIG. 4, support members 50, 50 made of a thick sheet steel are also interposed between the upper member plate 22 and the lower member plate 23 in such a manner that a front end 51 thereof is welded to the bulkheads 40, 40 in the vicinity of the disconnection initiating point G, a circumferential edge thereof extends longitudinally rearward along the inner side of the upper member plate 22 and the inner side of the lower member plate 23, and a rear end 52 thereof is welded to a front wall 34 of the member main body 20.

In other words, the support members 50, 50 are provided at the root portions of the forward portions 30, 31 so as to extend continuously from the bulkheads 40, 40.

In addition, the support member 50 is also attached in advance to the upper member plate 22 when the front end 51 and the circumferential edge thereof are welded in advance to the bulkhead 40 and the upper member plate 22, respectively. Then, in a later step, flanges 53, 54 are slot (or plug) welded to the lower member plate 23 from the outside.

With the support members 50, 50 being disposed in such a manner as has been described above, in the event that the force F is input to the lower arms 100, 101 as described above, and hence, even if the rotational force F' is generated in the forward portions 30, 31 at the bifurcated end of the suspension cross member via the forward arms 102, 103, the rotational force F' so applied is caused to act on the bulkhead 40 as a compression force (a strut force) via the support member 50, and the rotation of the forward portions 30, 31 are suppressed, whereby the force applied to the disconnecting initiating point G is relaxed, thereby making it more difficult for the welding between the upper member plate 22 and the lower member plate 23 to be broken.

In the event that rotational force is generated in the rearward portions 32, 33, since the rotational force so generated is caused to act on the support members 50 as a compression force (a strut force) via the bulkhead 40, the force acting on the bifurcation proximal end portion P is suppressed and hence stress concentration at the bifurcation proximal end portion P is alleviated.

Therefore, it becomes possible to prevent cracks from generating in the bifurcation proximal end portion P and to prevent fatigue destruction while decreasing costs and weight by not using thick plates for the upper and the lower member plates 22, 23.

In the present embodiment, since the forces acting on the disconnection initiating point G of the openings 27, 28 are alleviated, the braking off of the welding between the upper member plate 22 and the lower member plate 23 in the vicinity of the disconnection initiating point G can be particularly prevented.

While the embodiment of the suspension cross member according to the invention has fully been described heretofore, embodiments according to the invention are not limited to the embodiment that has been described above.

For example, while the bulkhead 40 and the support member 50 are described as separate members, they may be integrated into a single unit, if possible.

While the suspension cross member 1 has openings 27, 28 in the above embodiment, the present invention is applicable to a suspension cross member having no openings, having a circumferential flange welded to the upper and the lower member plates over the entire circumference and having a complete closed cross section formed by the upper and the lower member plates.

As has been described heretofore, according to the first aspect of the invention, the bulkheads are interposed between the upper member plate and the lower member plate at root portions of the rearward portions of the suspension cross member in such a manner as to extend longitudinally rearward from the disconnection initiating points located on the forward arm side of the openings along the inner side of the upper plate member and the inner side of the lower plate member, and the bulkheads are joined to the upper member plate and the lower member plate, respectively, at least in the vicinity of the disconnection initiating points on the forward arm side of the openings. Consequently, even if there is an input which is applied to the lower arm toward the rear of the vehicle, a rotational force is then applied which attempts to rotate the forward portion rearward via the forward arm, and eventually a large force is caused to act which attempts to break the joint between the upper member plate and the lower member plate, since the bulkheads are joined to the upper member plate and the lower member plate in the vicinity of the disconnection initiating points, the joint between the upper member plate and the lower member plate is prevented from being broken at the disconnection initiating points.

In addition, according to the second aspect of the invention, since the opening does not open abruptly from the disconnection initiating point but opens gradually, when the rotational force is applied which attempts to rotate rearward the forward portion at the bifurcated end of the suspension cross member, the rotational force so applied is caused to be transmitted substantially along the upper member plate and the lower member plate, and hence the opening is made difficult to be deformed, whereby the disconnection initiating point is made difficult to shift to the bulkhead side, the joint between the upper member plate and the lower member plate being thereby made more difficult to be broken at the disconnection initiating points.

Additionally, according to the third aspect of the invention, since the circumferential flange is provided along the circumferential edge of the bulkhead in such a manner as to extend toward the opening side from the location corresponding to the disconnection initiating point on the forward arm side over the predetermined range, the rigidity of the bulkhead itself is increased, so that the deflection and depression of the upper member plate and the lower member plate can be prevented in the ensured fashion. In addition, even in the event that the bulkhead is joined in advance to either of the upper member plate and the lower member plate and that the upper member plate and the lower member plate are overlapped at a later step, a jointing operation of the bulkhead to the other plate member can be implemented from the opening.

In addition, according to the fourth aspect of the invention, since the support members which are joined at one end thereof to the bulkhead are provided so as to extend at the root portions of the forward portions at the bifurcated end of the suspension cross member, even if there is an input which is applied to the lower arm toward the rear of the vehicle, and hence a rotational force is then applied which attempts to rotate rearward the forward portion via the forward arm, the rotational force is allowed to be applied to the bulkhead via the support member as a compression force (a strut force), and the rotation of the forward portion is suppressed so as to relax the force being applied to the disconnection initiating point, whereby the joint between the upper plate member and the lower plate member is made more difficult to be broken at the disconnection initiating point.

What is claimed is:

1. A suspension cross member adapted to be attached to an underside of a vehicle body in such a manner as to extend in a transverse direction of a vehicle, comprising:
    upper and lower member plates disconnected from each other in a vicinity of bifurcation proximal end portions at ends of the suspension cross member where the suspension cross member extends to be bifurcated into a forward portion located on a longitudinally forward side of the suspension cross member and a rearward portion located on a longitudinally rearward side of the suspension cross member to define openings and which are joined together along circumferential edges thereof to thereby have a closed cross section;
    support points for forward arms of a pair of lower arms that support wheels, the support points disposed on the forward portions of the upper and lower member plates at external positions to the closed cross section, respectively;
    support points for rearward arms of the pair of lower arms which are inserted through the openings, the support points disposed on the rear portions at internal positions of the closed cross section, respectively; and
    bulkheads provided between the upper and the lower member plates transversely and inwardly of the support points for the rearward arms in such a manner that a circumferential edge of each of the bulkheads extends longitudinally to a rear of the vehicle from a disconnection initiating point located on a forward arm side of the opening along inner sides of the upper and the lower plate members and each of the bulkheads being welded to the upper and lower plate members.

2. The suspension cross member as set forth in claim 1, wherein opening dimensions of the opening increase gradually in the vicinity of the disconnection initiating point.

3. The suspension cross member as set forth in claim 1, wherein a circumferential flange is provided along the circumferential edge of a bulkhead in such a manner as to extend toward the opening over a predetermined range including a location corresponding to the disconnection initiating point, the circumferential flange so provided is joined to the upper member plate and the lower member plate.

4. The suspension cross member as set forth in claim 1, wherein said each of the bulkheads is welded to the upper and the lower member plates at least in the vicinity of the disconnection initiating point.

5. The suspension cross member as set forth in claim 1, wherein a rear end of a bulkhead is welded to an inner surface of a rear wall of the upper and lower member plates.

6. A suspension cross member adapted to be attached to an underside of a vehicle body in such a manner as to extend in a transverse direction of a vehicle, comprising:
    upper and lower member plates disconnected from each other in a vicinity of bifurcation proximal end portions at ends of the suspension cross member where the suspension cross member extends to be bifurcated into a forward portion located on a longitudinally forward side of the suspension cross member and a rearward portion located on a longitudinally rearward side of the suspension cross member to define openings and which are joined together along circumferential edges thereof to thereby have a closed cross section;
    support points for forward arms of a pair of lower arms that support wheels, the support points disposed on the forward portions of the upper and lower member plates at external positions to the closed cross section, respectively;
    support points for rearward arms of the pair of lower arms which are inserted through the openings, the support points disposed on the rear portions at internal positions of the closed cross section, respectively;
    bulkheads provided between the upper and the lower member plates transversely and inwardly of the support points for the rearward arms in such a manner that a circumferential edge of each of the bulkheads extends longitudinally to a rear of the vehicle from a disconnection initiating point located on a forward arm side of the opening along inner sides of the upper and the lower plate members so as to be welded to the upper and lower plate members; and
    support members each of which is provided between the upper and the lower member plates in such a manner that the support member is joined at one end thereof to a bulkhead in the vicinity of the disconnection initiating point and extends longitudinally toward the front of the vehicle along the inner sides of the upper and the lower member plates so as to be joined to the upper and the lower member plates.

7. A suspension cross member adapted to be attached to an underside of a vehicle body in such a manner as to extend in a transverse direction of a vehicle, comprising:
    upper and lower member plates which are disconnected from each other in the vicinity of bifurcation proximal end portions at ends of the suspension cross member where the suspension cross member extends to be bifurcated into a forward portion located on a longitudinally forward side of the suspension cross member and a rearward portion located on a longitudinally rearward side of the suspension cross member to define openings and which are joined together along circumferential edges thereof to thereby have a closed cross section;

support points for forward arms of a pair of lower arms that support wheels, the support points disposed on the forward portions of the upper and lower member plates at external positions to the closed cross section, respectively;

support points for rearward arms of the pair of lower arms which are inserted through the openings, the support points disposed on the rear portions at internal positions of the closed cross section, respectively; and bulkheads provided between the upper and the lower member plates transversely and inwardly of the support points for the rearward arms in such a manner that a circumferential edge of each of the bulkheads extends longitudinally to a rear of the vehicle from a disconnection initiating point located on a forward arm side of the opening along inner sides of the upper and the lower plate members so as to be joined to the upper and lower plate members, each of the bulkheads being joined to the upper and the lower member plates at least in the vicinity of the disconnection initiating point; and support members each of which is provided between the upper and the lower member plates in such a manner that the support member is joined at one end thereof to the bulkhead in the vicinity of the disconnection initiating point and extends longitudinally toward the front of the vehicle along the inner sides of the upper and the lower member plates so as to be joined to the upper and the lower member plates.

* * * * *